Patented Mar. 28, 1939

2,151,932

UNITED STATES PATENT OFFICE 2,151,932

PROCESS FOR MANUFACTURING POROUS ARTICLES OF CLAY

Aage Nielsen, Copenhagen, Denmark

No Drawing. Application June 8, 1931, Serial No. 543,026. Renewed September 21, 1934. In Denmark April 30, 1931

2 Claims. (Cl. 106—11)

The present invention relates to a process for manufacturing porous articles of clay and to articles manufactured according to this process, and has for its object to reduce to a minimum the quantity of water used in the manufacture.

It is well known to manufacture porous articles of clay by causing air to be injected into the mass of clay. It is also known to produce such articles from clay by mixing a foam-producing substance into the mass of clay, after which the thus formed mixture is caused to foam by forceful working of the mass, or by a generation of air within the same, or by supplying air thereto. It is further known to mix the mass of clay with a previously formed foam, whereby the mass becomes porous.

These processes require the mass of clay employed to be of a not too stiff consistency. A suitable consistency is generally produced by addition of water.

Such an addition of water, however, has for its consequence in moulding the clay articles from the porous mass that the moulding methods known from the manufacture of ordinary nonporous clay masses cannot be used, as the porous mass of clay is too liquid to retain its shape. It is thus, for instance, not practical to produce porous tiles in the ordinarily used manner. If the liquid consistency is produced by increased addition of water, the porous tiles have to be cast, and the porous mass of clay has then to remain for quite a long time in the moulds, before the latter can be removed. Further the increased addition of water causes an increased shrinkage during the drying process, whereby drying without formation of cracks becomes difficult.

The present invention relates to a process whereby these drawbacks are remedied entirely. This object is attained by causing the mass of clay to become liquid by addition of the means used for producing "slip" or "casting-slip" from potter's clay, without the addition of water. The liquid mass of clay produced in this manner is then rendered porous in one of the above described manners, and the thus produced porous mass of clay is then given, by addition of chemical means, such a consistency that it can be moulded in normal manner.

By avoiding, in this manner, an increased admixture of water to the mass of clay, the advantage is attained that one is entirely at liberty to determine how long the mass of clay is to be maintained in liquid consistency.

The means required for working the process are known per se.

The means used for preparing slip masses are alkaline hydroxides or salts of alkalies and weak acids, such as potash, soda, water glass, etc., which substances modify the colloidal structure of the mass of clay and, thereby, cause the mass of clay to become liquid, when the admixture is effected inside of certain definite limits known in each individual case by those skilled in the art.

The porosity is then produced in one of the above described manners and the mass of clay thus treated is returned to a more solid consistency either by further addition of one of the means previously used for bringing the mass of clay into the liquid consistency or by an addition of special substances known for this purpose, for instance sodium chloride, sodium sulphate, calcium sulphate, calcium or magnesium chloride or like substances.

The process may be used for the production of coarse as well as fine ceramic articles.

What I claim as new is:

1. Process for the manufacture of porous ceramic articles of argillaceous materials, consisting in the following steps, first adding deflocculants to a stiff plastic mass of clay then making the thus produced fluid mass porous by incorporating gases therein and finally adding flocculants to the porous fluid mass and moulding the thus produced restiffened porous mass in known manner.

2. The method of making lightweight porous ceramic material which comprises mixing clay with a soluble silicate solution, foaming such mixture and introducing a chemical to bring about stiffening thereof.

AAGE NIELSEN.